J. A. WILKIN.
CLUTCH DEVICE.
APPLICATION FILED OCT. 1, 1912.
1,118,456.
Patented Nov. 24, 1914.
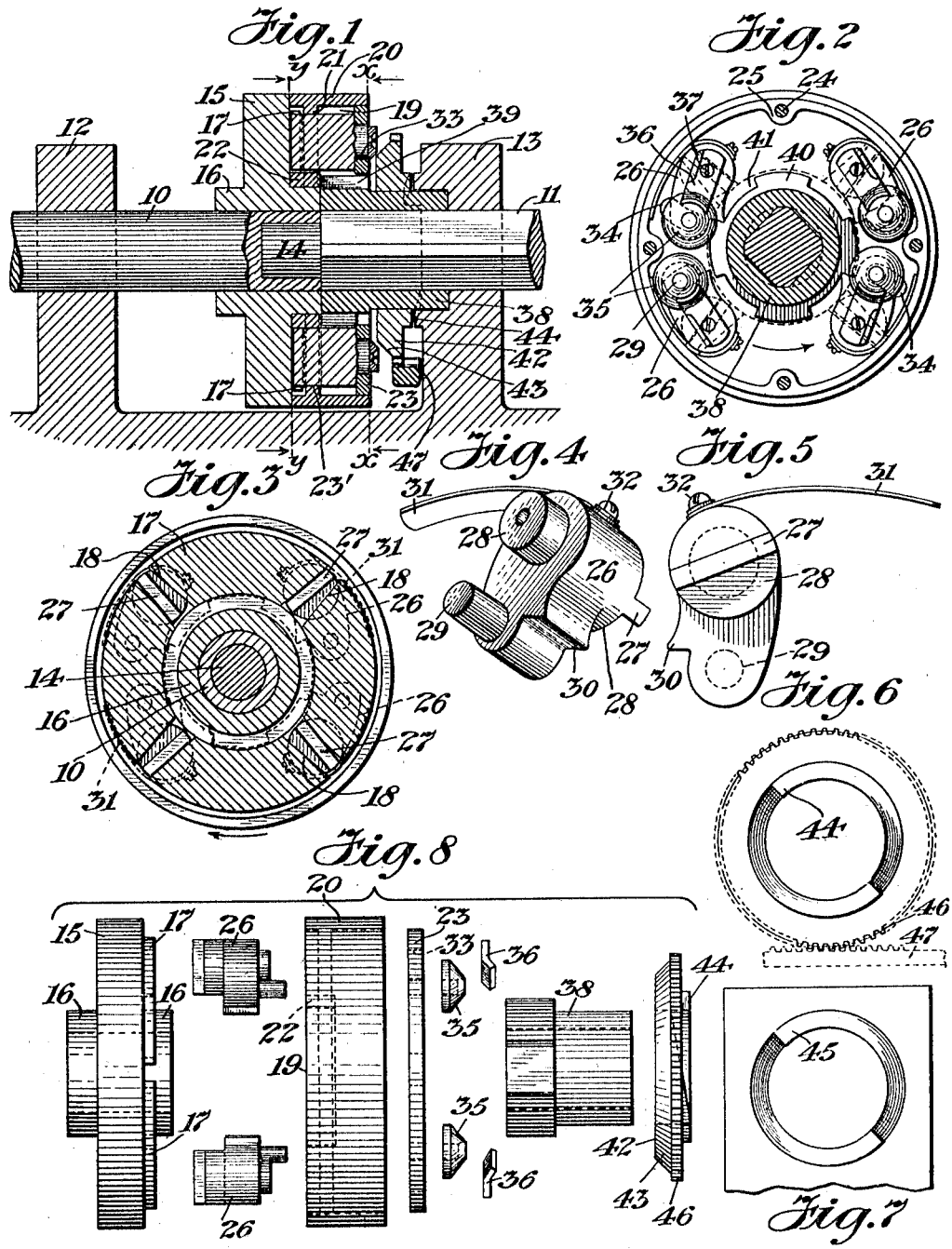

UNITED STATES PATENT OFFICE.

JOSEPH A. WILKIN, OF MATAMORAS, PENNSYLVANIA.

CLUTCH DEVICE.

1,118,456.  Specification of Letters Patent.  Patented Nov. 24, 1914.

Application filed October 1, 1912. Serial No. 723,324.

*To all whom it may concern:*

Be it known that I, JOSEPH A. WILKIN, a citizen of the United States, residing at Matamoras, in the county of Pike and State of Pennsylvania, have invented an Improvement in Clutch Devices, of which the following is a specification.

My present invention relates to an improvement in clutches, and particularly to clutches adapted to connect and disconnect the driving and driven parts of any transmission mechanism.

The object of my invention is the provision of a clutch including means for connecting and disconnecting the driving and driven parts of a clutch mechanism in such a manner that the connecting devices are positively actuated by the driving parts to engage the driven parts, thereby connecting the same to the driving parts. I also prefer to employ a plurality of devices for connecting the driving parts to the driven parts, and the construction is such that when one of the connecting devices, or one set of the same, is actuated to connect the driving and driven parts, another connecting device, or set of connecting devices, is actuated to disengage the driving and driven parts, the first connecting device, or set of connecting devices, being adapted to turn the driven parts in one direction, and the second connecting device, or set of connecting devices, to drive or turn the driven parts in the opposite direction.

In carrying out my invention, I also provide means for maintaining all the said connecting devices out of engagement with the driven parts, so that the driving parts may turn free of the driven parts, as will be hereinafter more particularly described.

In the drawing, Figure 1 is a central longitudinal cross section of a clutch illustrating my present invention. Fig. 2 is a cross section on line $x$ $x$, Fig. 1. Fig. 3 is a cross section on line $y$ $y$, Fig. 1. Fig. 4 is a perspective view of one of the dogs employed in my improved clutch, viewing the same from one side thereof. Fig. 5 is a side elevation of one of these dogs, viewing the same from the other side thereof. Fig. 6 is an elevation of the collar, provided with cam surfaces. Fig. 7 is a partial elevation of the bearing block, also provided with cam surfaces, and Fig. 8 is an elevation of the respective parts which are combined to form my improved clutch, these parts in this figure being illustrated in the proper relationship for being assembled.

Referring particularly to the drawing, my improved clutch, as applied to a transmission apparatus, preferably comprises a drive shaft 10, which, it will be understood, is driven directly or otherwise by any prime mover or source of power. In alinement with the drive shaft 10 is a driven shaft 11. As shown diagrammatically in the drawing, the drive shaft 10 is journaled in a suitable bearing block 12, and the driven shaft 11 passes through a bearing block 13. These features, however, are only used to illustrate more or less diagrammatically the way these shafts may be journaled, because, as it will be understood, they may be mounted in any necessary manner. The end of the drive shaft 10, adjacent to the end of the driven shaft 11, is preferably recessed to receive the reduced cylindrical end 14 of the driven shaft 11. The drive shaft 10 is preferably circular in cross section, and the end of the driven shaft is fitted and adapted to turn within the bearing in the end of the drive shaft to maintain the shafts in alinement, and also to make it possible for the shafts to be turned at different speeds and the driven shaft to remain stationary while the drive shaft is turning. On the end of the drive shaft 10 is secured a drive disk 15, provided with a hub 16, and on the opposite faces of the drive disk 15, there are circular ribs or flanges, indicated at 17. The disk 15 is preferably shrunk on the shaft 10. In suitably spaced positions, these ribs 17 are provided with radial recesses 18. As will be understood, these circular flanges 17 may be made integral with the drive disk 15 and the recesses 18 cut therein, or the flanges may be made of segmental strips of necessary length and suitably attached to the faces of the drive disk so as to leave the recesses 18 between their adjacent ends.

Associated with the drive disk 15, and on the right hand side thereof, as shown in Fig. 1, I employ a casing, indicated at 19, and preferably comprising a rim 20 of the same diameter as the drive disk 15, a web member 21 and a flange 22, adapted to fit over one of the hubs 16 of the drive disk 15. The web 21 is provided with openings 23', the purpose and functions of which will be hereinafter indicated, and associated with the casing is a face plate 23, which may be suitably secured thereto by screws 24 passing through the face plate and turning down into lugs 25 provided for this purpose in the casing. Within this casing, I employ a series of dogs. These dogs are made in rights and lefts and employed in pairs and are indicated in the drawing at 26. Each dog is provided on one face with a transverse rib 27, on the opposite face with a trunnion 28 and a pin 29, and each dog is also so formed as to be provided with a tooth 30. Connected to each dog is a spring 31, which may be secured thereto by a suitable screw and washer 32, or otherwise. The dogs 26 are mounted within the casing 19, the face plate thereof being provided with apertures 33, in which the trunnions 28 of the dogs are journaled, the transverse rib 27 of each dog passing into one of the recesses 18 formed in the flange 17 on the drive disk 15, the width of each of these recesses being at least twice the thickness of the transverse rib 27 of each dog. The face plate 23 is also provided with a series of elongated apertures 34, through each of which the pin 29 of one of the dogs extends, and exteriorly of the face plate 23 each pin 29 is fitted with a button 35, adapted to turn freely thereon, and provided with an inclined or tapered face, each button 35 being maintained in position on its pin 29 with its inner face against the outer face of the plate 25 by means of a stop 36. The stop 36 of each dog is secured in position by a screw 37 passing through the same and into a tapped opening provided therefor in the trunnion 28 of the dog to which the stop is attached. When in position within the casing, the spring 31 of each dog presses against the inner surface of the rim 20 and assists in causing the pin 29 to bear against the innermost end of the aperture 34, through which it passes, with the tooth 30 of the dog in its innermost position.

On the end of the driven shaft 11, is a collar 38, which is fixed on the shaft by being provided with a rectangular opening through which the shaft passes, or otherwise. Formed integral with or suitably connected to the collar 38, is a ratchet 39, adapted to come within the casing 19. As illustrated in the drawing, this ratchet is preferably provided with four teeth 40 and intermediate recesses 41, the extent of the teeth and the width of the recesses being substantially equal, and as will be hereinafter explained, the teeth of one pair of dogs are adapted to lie within one pair of the recesses 41, while the teeth of the other pair of dogs are adapted to lie against the faces of the intermediate ratchet teeth 40.

Mounted to turn freely on the collar 38 is a ring 42. This ring 42, on one side, is provided with an inclined or tapered face 43, set at the same angle as the inclined faces of the bottoms 35, and on the opposite side of the ring 42, and immediately surrounding the collar 38, there are cams 44. On the bearing block, through which the driven shaft 11 passes, and immediately surrounding the collar 38, there are similar but opposite cams 45, the cams 44 and 45 being adapted to act in conjunction with one another to move the ring 42 from its right hand to its left hand position, and vice versa. The ring 42 is preferably provided with gear teeth 46 cut in its periphery and adapted to mesh with the teeth of a rack 47, which may be actuated from a lever, or otherwise, to turn the ring 42. In the positions of the hereinbefore described parts, as indicated in Figs. 2 and 3 of the drawing, the ring 42 is in its extreme right-hand position, in which it has not contact with the buttons on any of the dogs 26, so that the springs 31 of these dogs cause the teeth thereof to remain in contact with the ratchet 39 when all the parts are at rest.

As shown particularly in Figs. 2 and 3, the dogs are so arranged as to be employed in oppositely disposed pairs. That is to say, when the teeth of one pair of dogs engage in the recesses 41 of the ratchet, the teeth of the other pair of dogs rest against the faces of the teeth 40 on the ratchet and vice versa. It will also be apparent from Figs. 2 and 3 that one pair of dogs is adapted to engage the teeth on the ratchet 39 to turn the driven shaft in one direction and the teeth of the other pair of dogs to engage the ratchet to turn the driven shaft in the opposite direction. It being understood, of course, that in order to do this, it is necessary to reverse the engine or prime mover. It will also be apparent that the arrangement and the width of the recesses between the teeth and the ratchet are such that in the engagement of the teeth of either pair of dogs with the teeth of the ratchet, the dog teeth first come into contact with the bases of the recesses, and the continued movement of the ratchet causes the teeth to slide over these bases of the recesses before the dog teeth actually come into positive engagement with the teeth of the ratchet. This action insures the dogs being pressed sufficiently far to properly engage the teeth of the ratchet before the engagement actually takes place, and thus prevents any possible slipping between the engaging members of the clutch.

In the positions as hereinbefore described, and as will be apparent, the driven shaft was connected to the drive shaft. Now, by imparting a partial rotation to the ring 42, through the movement of the rack 47 or otherwise, this ring, by virtue of the cams 44 and 45, may be moved on the collar 38 in a direction from right to left. This movement of the ring 42 causes the inclined face 43 thereof to contact with the inclined faces of the buttons attached to all the dogs and, as will be obvious, the continued movement of the ring 42 in this direction until its left-hand face contacts with the adjacent surface of the casing will swing all the dogs outwardly sufficiently far to free the dog teeth from the ratchet teeth and maintain the dogs in this position so long as the ring is in its left-hand positions, thereby permitting the drive shaft 10 to turn freely in either direction without imparting any motion to the driven shaft 11. By turning the ring 42 in the opposite direction, the ends of the flange portions 17 acting on the ribs 27, assisted by the actions of the springs 31, will cause all the dogs to swing inwardly again, and the action of the buttons against the inclined face of the ring will force the same from its left-hand to its right-hand position, in which, as will be understood, either one set or the other set of dogs will be brought into play, depending upon which direction the drive shaft is turned. The disconnected position of the drive and driven shafts is shown in Fig. 1 and, as hereinbefore stated, the connected position between the drive and driven shafts is shown in Figs. 2 and 3.

As heretofore indicated, the functions of the springs 31, one of which is associated with each of the dogs 26, is merely to assist in maintaining the dogs, or the teeth thereof, in contact with the surface of the ratchet 39, and these springs may be entirely dispensed with, if necessary or desirable, in any given structure. The recesses 18, in the flange 17 of the drive disk 15, are of greater width at their inner ends than at their outer ends. In other words, the ends of the segmental portions of the flange 17 are tapered, as shown particularly in Fig. 3. The sides of the rib 27, on each dog, are parallel and this being the case, and as will be apparent, when the power is applied to drive the disk 15, the outer end of the edge of a segmental portion of the flange 17 will contact with the outer end of the rib 27 on any given dog, the circular motion of the flange tending to swing the free ends of one pair of the dogs inwardly to maintain their teeth in contact with the surface of the ratchet, and to swing the free ends of the other pair of dogs outwardly, to free their teeth from the ratchet, and the construction is such that when the dog is in its driving position, the adjacent faces of the end of the segmental portion of the flange and the rib 27 of the dog are in contact with each other for their entire length. This structure, as will be readily understood, and as hereinbefore stated, makes it possible to dispense entirely with the use of the springs 31, if, for any reason, it appears desirable to do so.

In the operation of the hereinbefore described mechanism, the drive shaft 10 may turn independently of the driven shaft 11, when the ring 42 is moved from right to left, so as to cause its inclined face to engage the buttons 35, in order that in acting through the same all the dogs 26 may be held in such positions that they cannot engage the teeth 40 of the ratchet 39. When, however, the ring 42 is shifted in the opposite direction and assumes the position shown in Fig. 1, either one set of dogs 26 or the other set of the dogs will engage the teeth of the ratchet, depending, as will be understood from the foregoing description, upon the direction in which the drive shaft is turned. When turned in a counter-clockwise direction, as shown in Fig. 2, the upper left-hand dog and lower right-hand dog are moved to engagement with the teeth of the ratchet, whereas the upper right-hand dog and the lower left-hand dog are moved to a position in which they cannot engage the teeth of the ratchet. When moved in a clockwise direction, as the parts are viewed in Fig. 2, the upper right-hand dog and the lower left-hand dog will be moved to engage the teeth of the ratchet, while the upper left-hand dog and the lower right-hand dog will be moved to position where they cannot engage the teeth of the ratchet. As is also hereinbefore described, this shifting of the positions of the dogs is effected by the drive disk acting upon the ribs 27 on the sides of the respective dogs, and, as will be also understood, the ring 42 may be turned by a suitable rack 47, or in any other desired manner.

I claim as my invention:

1. In a clutch device, a drive shaft, a driven shaft in alinement therewith, a drive disk secured on the end of the drive shaft, a collar fixed on the end of the driven shaft, a casing at the side of the drive disk, a ratchet on the said collar, a dog pivotally mounted in the said casing and engaging the drive disk, and means for actuating the said dog to permit the same to engage the ratchet and to cause it to be disengaged from the ratchet.

2. In a clutch device, a drive shaft, a driven shaft in alinement therewith, a drive disk secured on the end of the drive shaft, a collar fixed on the end of the driven shaft, a casing at the side of the drive disk, a ratchet on the said collar, a dog pivotally mounted in the said casing and engaging the drive disk, means for normally maintaining the dog in contact with the ratchet, and means for actuating the said dog to permit the same to engage the ratchet and to cause it to be disengaged from the ratchet.

3. In a clutch device, a drive shaft, a driven shaft, a drive disk fixed on the end of the drive shaft, a collar secured to the end of the driven shaft, a ratchet on the said collar, a casing associated with the drive disk, a dog pivotally mounted in the casing, a rib on the said dog entering a recess provided therefor between parts of the said drive disk to connect the drive disk to the ratchet through the said dog, and means for actuating the dog to cause the same to become disengaged from the said ratchet.

4. In a clutch device, a drive shaft, a driven shaft, a drive disk fixed on the end of the drive shaft, a collar secured to the end of the driven shaft, a ratchet on the said collar, a casing associated with the drive disk, a dog pivotally mounted in the casing, a rib on the said dog entering a recess provided therefor between parts of the said drive disk to connect the drive disk to the ratchet through the said dog, means for causing the dog to normally contact with the ratchet, and means for actuating the dog to cause the same to become disengaged from the said ratchet.

5. In a clutch device, a drive shaft, a driven shaft, a drive disk fixed on the end of the drive shaft, a collar secured to the end of the driven shaft, a ratchet on the said collar, a casing associated with the drive disk, a dog pivotally mounted in the casing, a rib on the said dog entering a recess provided therefor between parts of the said drive disk to connect the drive disk to the ratchet through the said dog, a spring associated with the said dog and adapted to bear against the inner surface of the casing to maintain the dog in contact with the ratchet, and means for actuating the dog to cause the same to become disengaged from the said ratchet.

6. In a clutch device, a drive shaft, a driven shaft in alinement therewith, a drive disk fixed on the end of the drive shaft, a collar secured to the end of the driven shaft, a ratchet on the said collar, a casing associated with the drive disk, a dog pivotally mounted at one end in the said casing, a rib at the other end of the said dog entering a recess provided therefor between parts of the said drive disk in order to connect the same with the ratchet through the said dog, a ring mounted on the said collar and adapted to engage and move the said dog out of contact with the ratchet, and means for shifting the said ring to actuate the dog.

7. In a clutch device, a drive shaft, a driven shaft in alinement therewith, a drive disk fixed on the end of the drive shaft, a collar secured to the end of the driven shaft, a ratchet on the said collar, a casing associated with the drive disk, a dog pivotally mounted at one end in the said casing, a rib at the other end of the said dog entering a recess provided therefor between parts of the said drive disk in order to connect the same with the ratchet through the said dog, a button connected to the dog exteriorly of the said casing, a ring on the collar adapted to engage the said button to swing the dog out of contact with the ratchet, and means for shifting the said ring on its collar.

8. In a clutch device, a drive shaft, a driven shaft in alinement therewith, a drive disk fixed on the end of the drive shaft, a collar secured to the end of the driven shaft, a ratchet on the said collar, a casing associated with the drive disk, a dog pivotally mounted at one end in the said casing, a rib at the other end of the said dog entering a recess provided therefor between parts of the said drive disk in order to connect the same with the ratchet through the said dog, a button connected to the dog exteriorly of the said casing, a ring on the collar adapted to engage the said button to swing the dog out of contact with the ratchet, a cam on the said ring, a journal block through which the driven shaft and collar pass, a cam on the said journal block adapted to co-act with the cam on the ring, and means for turning the ring to cause the said cams to shift the same on its collar to swing the dog out of contact with the ratchet.

9. In a clutch device, a drive shaft, a driven shaft in alinement therewith, a drive disk fixed on the end of the drive shaft, a collar secured to the end of the driven shaft, a ratchet secured to the collar, a ring loosely mounted on the collar, means for moving the ring on the collar longitudinally of the shaft, devices associated with the drive disk and adapted normally to contact with the said ratchet, and means actuated by the said ring, in its longitudinal movement on the collar, to swing the said devices out of contact with the ratchet.

10. In a clutch device, a drive shaft, a driven shaft in alinement therewith, a drive disk fixed on the end of the drive shaft, a collar secured to the end of the driven shaft, a ratchet secured to the collar, a ring mounted loosely on the said collar and having an inclined face on one side thereof, a cam on the opposite side of said ring, a bearing block, a cam on the surface thereof, adapted to be engaged by the cam on the said ring so as to move the ring on the collar longitudinally of the shaft when a partial rotation is imparted to the ring, a dog associated with the said drive disk, a pin secured in the dog, a button mounted on the pin, and means for imparting a partial rotation to the said ring to shift the same longitudinally on the collar to cause its inclined face to engage the said button to swing the dog out of contact with the ratchet.

Signed by me this 28th day of August, 1912.

JOSEPH A. WILKIN.

Witnesses:
 GEO. T. PINCKNEY,
 J. B. LE BLANC.

Copies of this patent may be obtained for five cents each, by addressing the "Commissioner of Patents, Washington, D. C."